United States Patent
Cole et al.

[11] Patent Number: 6,109,287
[45] Date of Patent: Aug. 29, 2000

[54] RESETTABLE EARTHQUAKE GAS LINE VALVE

[76] Inventors: Thomas H. Cole, 10307 Glenbarr Ave., Los Angeles, Calif. 90064; Garrett Craig, 211 S. Del Sol La., Diamond Bar, Calif. 91765

[21] Appl. No.: 09/153,237

[22] Filed: Sep. 15, 1998

[51] Int. Cl.$^7$ .................................................. F16K 17/36
[52] U.S. Cl. ........................................... 137/38; 137/559
[58] Field of Search ..................................... 137/38, 559

[56] References Cited

U.S. PATENT DOCUMENTS

| | | | |
|---|---|---|---|
| 2,585,316 | 2/1952 | Hobson | 137/38 |
| 3,747,616 | 7/1973 | Lloyd | 137/38 |
| 4,715,394 | 12/1987 | O'Donnell et al. | 137/38 |
| 4,844,113 | 7/1989 | Jones | 137/39 |
| 5,240,025 | 8/1993 | Morris | 137/38 |
| 5,853,019 | 12/1998 | Hollenback | 137/38 |

*Primary Examiner*—Gerald A. Michalsky
*Attorney, Agent, or Firm*—Jacobson, Price, Holman & Stern, PLLC

[57] ABSTRACT

A gas line valve incorporated into the gas supply line which will automatically close when a gas line and associated building structure or ground surface is subjected to violent movement caused by an earthquake of a magnitude that could rupture or damage the gas line. The valve of this invention is manually resettable when the gas line and all utilities or appliances have been tested for gas line breakage or rupture after violent movements caused by the earthquake have ceased. The resettable earthquake valve includes a ball valve which is stored and retained in an open position with violent movements moving the ball valve to a closed position on a valve seat in the gas flow path. The ball valve is magnetically retained on the valve seat and can be reset to open position by manual activation of reset mechanism after the earthquake and aftershocks cease and all gas lines have been inspected thereby reducing the possibility of a ruptured gas line discharging gas into the atmosphere which can result in extensive fire damage to a building and possible injury to occupants.

12 Claims, 4 Drawing Sheets

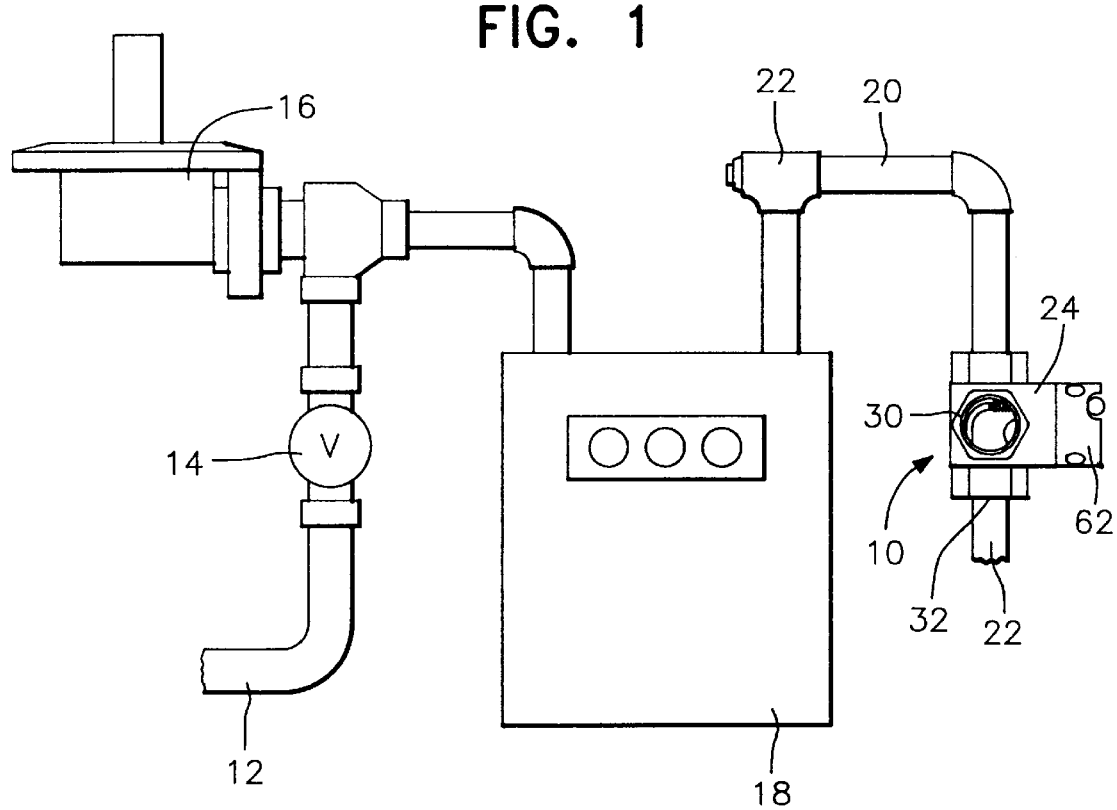
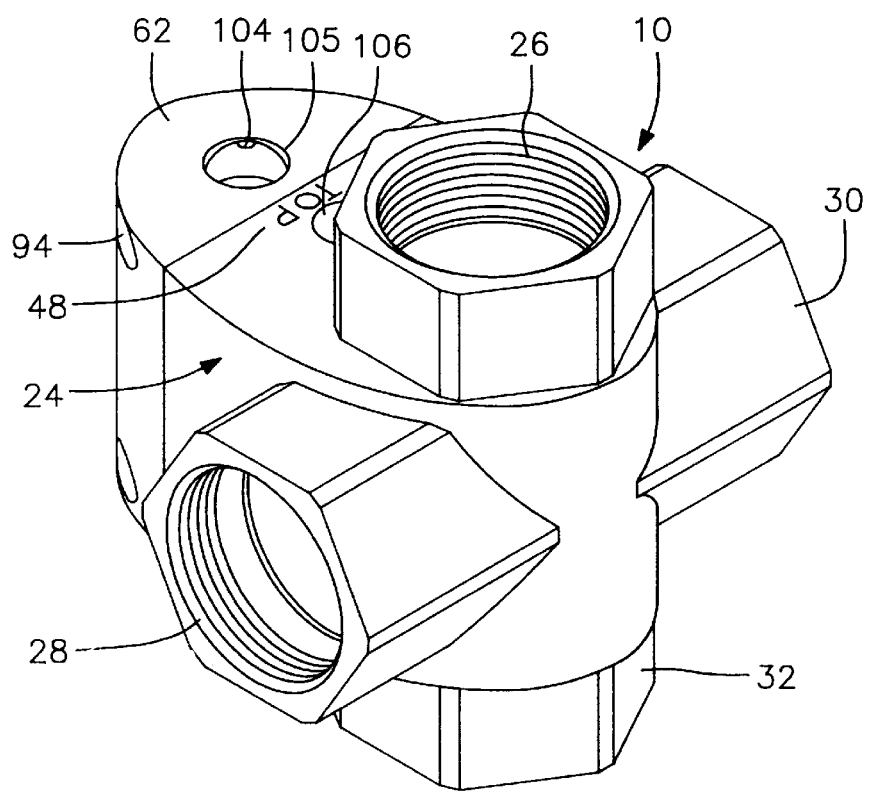

RESETTABLE EARTHQUAKE GAS LINE VALVE

BACKGROUND OF THE INVENTION

1. Field of the Invention

The present invention generally relates to a gas line valve incorporated into a gas supply line which will automatically close when the gas line and associated building structure is subjected to violent movements caused by an earthquake of a magnitude that could rupture the gas line. The valve of this invention is manually resettable when the gas line and all utilities or appliances have been tested for gas line breakage or rupture after violent movements caused by an earthquake have ceased.

The resettable earthquake valve includes a ball valve which is stored and retained in an open position by a unique mechanical structure which enables the ball valve to move to a closed position onto a valve seat in the gas flow path in response to earthquake induced movements of a predetermined magnitude. The valve seat will magnetically retain the ball valve in a sealed closed position until reset thereby preventing further gas flow from a gas flow supply line to a gas line connected with various utilities and appliances and retaining the valve closed during any aftershocks which may occur. This valve provides an emergency safety earthquake valve which will automatically close when subjected to violent movements caused by an earthquake and which can be manually reset after the earthquake is over and all gas lines have been inspected thereby reducing the possibility of a ruptured gas line discharging gas into the atmosphere which can result in extensive fire damage to a building and possible injury to occupants.

2. Description of the Prior Art

Automatically closed valves for supply lines for pressurized fluids, including flammable gas, are well known. Such known valves include those which are temperature responsive so that in the event of a fire in a home or building, a gas line shutoff valve having a fusible member which normally retains the valve in open position will permit the valve to automatically close when the fusible member is ruptured by heat thereby eliminating gas supply to the fire.

SUMMARY OF THE INVENTION

The resettable earthquake gas line valve of the present invention is installed in a conventional gas supply system in a gas supply line downstream of a shutoff valve and gas meter and upstream of various gas utilities and appliances. The valve includes a valve body having an upwardly facing valve seat communicating with an outlet gas fitting and a gas inlet fitting in communication with the valve seat for flow of gas through the valve seat to a gas supply line leading to gas utilities or appliances. The valve body includes a lateral extension including an inclined ramp associated with the valve seat which enables a ball valve to move between a closed position on the valve seat and an open position on the inclined ramp. The ball valve is retained in open position on the inclined ramp in spaced relation to the valve seat during normal function of the gas line system. When the gas line valve is subjected to violent movements such as might occur during earthquakes of a predetermined magnitude which may rupture or break the gas supply line leading to gas utilities or appliances, a recess which retains the ball valve on the ramp will be overcome by the violent movements and the ball valve will be moved onto the valve seat and be held in sealed relation on the valve seat by magnetic attraction during any aftershocks thereby preventing further discharge of gas to the gas utilities or appliances.

The valve body includes a manual reset structure which can move the ball valve off the valve seat back onto the ramp after earthquake movement has ceased and after all gas utilities and gas appliances and the gas supply line have been checked for rupture or leakage. The resettable earthquake gas line valve of this invention will be automatically closed when earthquake forces are exerted on a home or other building structure or surrounding earth formations and the earthquake ball valve will be magnetically retained in sealed relation on the valve seat until all aftershocks have ceased and gas utilities, appliances and gas lines have been inspected after which the valve can be manually reset to open position.

Accordingly, it is an object of the present invention to provide a resettable earthquake gas line valve which is retained in open position with the retention being overcome in response to violent movements caused by an earthquake of predetermined magnitude which enables the valve to move automatically to a closed position thereby shutting off the supply of gas to gas utilities, appliances and the like.

Another object of the invention is to provide a gas line valve in accordance with the preceding object in which the valve includes a valve body with a valve seat formed therein, a ball valve engaging the valve seat when in closed position and an inclined ramp communicated with the valve seat and supporting and retaining the ball valve in open position on the ramp. The structure retaining the ball valve on the ramp is overcome by violent movements caused by an earthquake which permits the ball valve to move onto the valve seat for retention in sealed relation to the valve seat by magnetic attraction and by the weight of the ball valve.

A further object of the invention is to provide a gas line valve in accordance with the preceding objects in which the ball valve can be manually returned from its closed position on the valve seat to its open position on the ramp after earthquake aftershock movements have ceased and after the gas supply line, gas utilities and appliances all have been inspected to make certain that all gas flow paths have not been ruptured and do not leak.

Still another object of the present invention is to provide a resettable earthquake gas line valve in accordance with the preceding objects in which the valve includes a body having a downwardly opening outlet for connection to a supply line leading to gas utilities or gas appliances with the outlet including a valve seat facing upwardly for engagement by a ball valve with the valve body also including multiple gas inlets to enable the gas supply line from a gas meter to be optionally connected to the valve body at the top or opposite sides.

A still further object of the invention is to provide a gas line valve in accordance with the preceding objects in which the valve body includes a bullseye bubble level and a sight glass in the top surface thereof to enable the valve body to be oriented in a generally vertical position and enabling observation of the ball valve, ramp and valve to enable the position of the ball valve to be determined.

Yet another important object of the invention is to provide a gas line valve in accordance with the preceding objects in which the valve body is constructed of separable components to enable internal components of the valve to be cleaned, replaced, or repaired in order to maintain the valve in effective operating condition.

These together with other objects and advantages which will become subsequently apparent reside in the details of construction and operation as more fully hereinafter described and claimed, reference being had to the accompanying drawings forming apart hereof, wherein like numerals refer to like parts throughout.

BRIEF DESCRIPTION OF THE DRAWINGS

FIG. 1 is a schematic illustration of a gas supply system illustrating the orientation of the gas line valve of the present invention in the system.

FIG. 2 is a perspective view of the resettable earthquake gas line valve of the present invention.

DESCRIPTION OF THE PREFERRED EMBODIMENT

Figure 3:
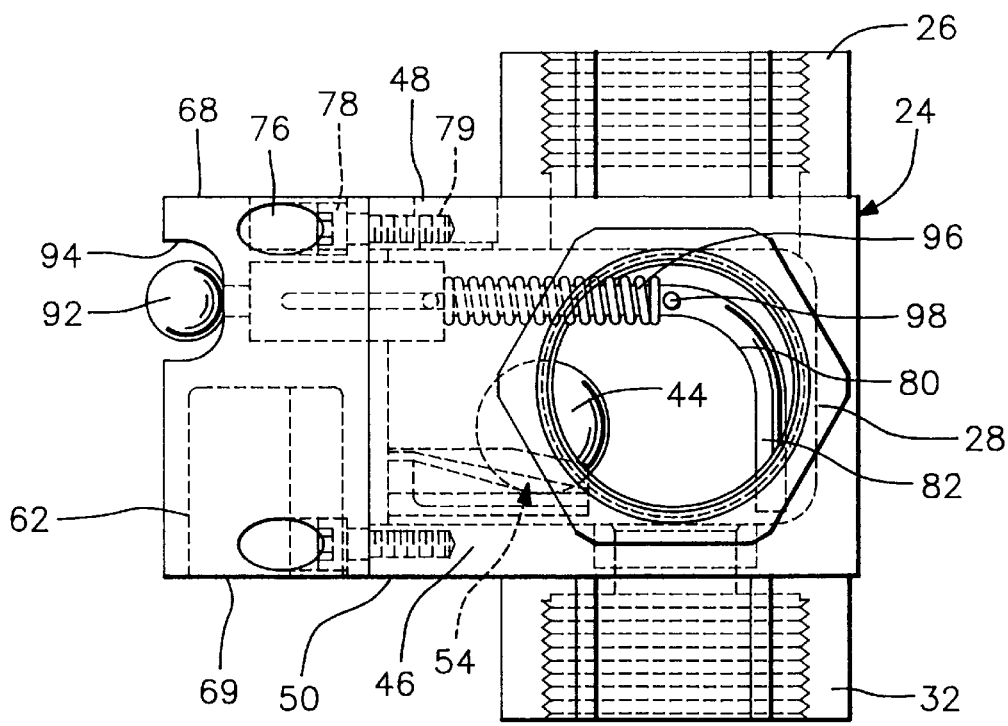
FIG. 3 is a side elevational view of the gas line valve.

Although only one preferred embodiment of the invention is explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

FIG. 1 illustrates the resettable earthquake gas line valve of the present invention generally designated by reference numeral 10 installed in a typical gas supply system including a gas supply line or gas main 12 communicating with a street gas main or the like and including a shutoff valve 14, a gas line pressure regulator 16 and a gas meter 18 which are all of conventional construction. The gas meter 18 is communicated with a gas line 20 connected to a tee 22 having one branch plugged and extending vertically downwardly and connected with an upper portion of the gas line valve 10 of the present invention. The lower portion of the gas line valve 10 is connected to a gas supply line 22 which extends to various gas utilities or gas appliances.

The gas line valve 10 of the present invention includes a hollow valve body 24 having internally threaded inlet fittings 26, 28 and 30 with the inlet fitting 26 being at the top of the valve body 24 and the inlet fittings 28 and 30 being at opposite sides thereof. The bottom of the valve body is provided with an internally threaded gas outlet fitting 32 connected with the gas supply line 22. Each of the inlet and outlet fittings are internally threaded and are of a standard size and have standard threads for connection to standard gas lines. For example, the valve inlet and outlet fittings may be connected to a 1¼ inch gas line. While FIG. 1 indicates that the gas inlet line 20 is connected to the top gas inlet fitting 26, it is pointed out that the gas inlet line 20 could be connected to either one of the inlet fittings 26, 28 and 30 with the non-used inlet fittings being provided with a closure plug. The valve body outlet fitting 32 is always oriented at the bottom of the valve body and connected with the gas supply line 22 extending to the gas utilities or appliances.

Figure 4:
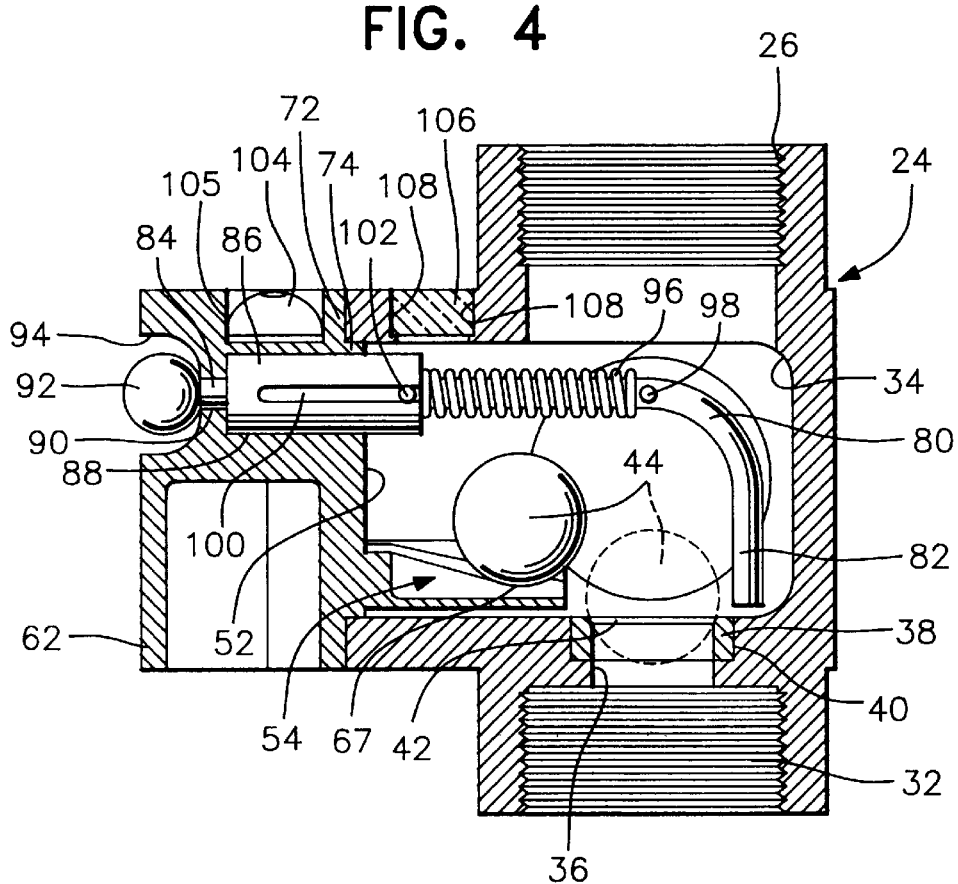
FIG. 4 is a vertical sectional view of the gas line valve illustrating the structure and association of the internal components of the gas line and their relationship to the valve body.
Figure 5:
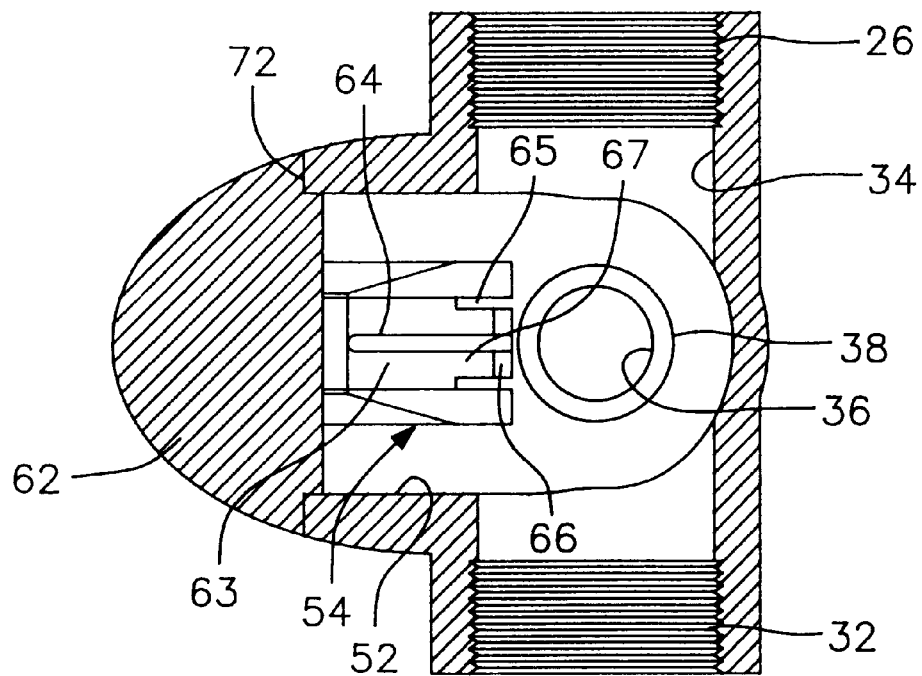
FIG. 5 is a transverse plan sectional view of the valve body with the ball valve removed to illustrate the structure of the ramp and its association with the valve seat.
Figure 6:
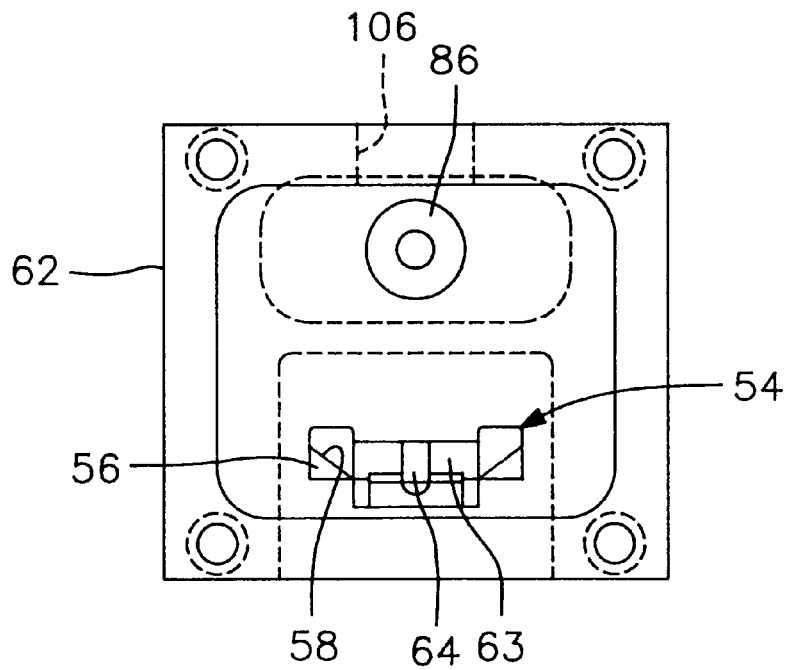
FIG. 6 is an elevational view of the inner end of a removable component of the valve body illustrating additional details of the ball valve ramp.
Figure 7:
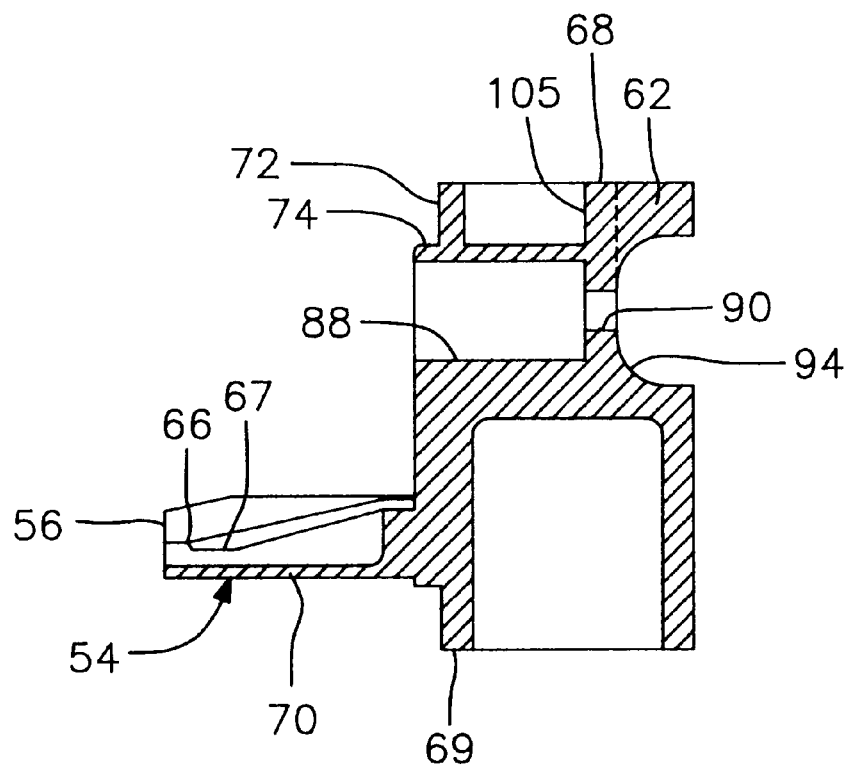
FIG. 7 is a vertical sectional view of the structure in FIG. 6 illustrating additional details of the ball valve ramp.

As illustrated in FIG. 4, the interior of the valve body 24 is hollow as indicated by reference numeral 34 with the hollow interior being communicated with all of the fittings 26–32. The hollow interior 34 of the valve body 24 includes a flow path 36 communicating with the discharge fitting 32 with the flow path 36 including an annular valve seat 38 in the form of a permanent magnet mounted in a shouldered recess 40 with the upper edge of the valve seat 38 including a beveled inner upper edge 42 which will sealingly engage with and magnetically retain a ball valve 44 on the valve seat when the ball valve is positioned on the valve seat 38 as illustrated by broken line in FIG. 4. When the ball valve 44 is positioned on the seat 38, gas flow through the flow path 36 and into the gas line 22 is prevented.

The valve body 24 includes a laterally extending portion 46 having generally flat upper and lower surfaces 48 and 50 with the hollow interior 34 also including a laterally extending hollow portion 52. The flat upper surface 48 has the word "TOP" inscribed thereon to insure proper installation of the valve. Attached to the laterally extending portion 46 of valve body 24 is a separable component 62 of the valve body 24 which includes a ramp 54 which extends into the bottom portion of the laterally extending hollow portion 52 of valve body 24 and terminates above a peripheral edge of valve seat 38. The ramp 54 is inclined and defined by a pair of generally parallel members 56 each of which includes a downwardly and inwardly inclined surface 58 extending inwardly from an outer end of each member 56. The top flat surface 60 of each member 56 extends longitudinally inwardly from a point spaced inwardly from the free end of the member 56 in an angled direction to a point 61 where the member 56 joins with the separable component 62 of the valve body 24. The ramp 54 on the separable component 62 of the valve body 24 also includes an inclined member 63 between the members 56 which includes a central groove 64, outer edge notches 65 in the outer end portions thereof and upturned beveled ends 66 which terminate adjacent valve seat 38.

The construction of the ramp includes a recess 67 formed in the upper surface of members 56 and 63 adjacent the outer ends thereof to hold the ball valve 44 thereon during seismic movement resulting from an earthquake less than about 4.5 on the richter scale. However, seismic movements which are generally in the shape of numeral 8 resulting from an earthquake having a magnitude over 5 on the richter scale would cause the ball valve 44 to move from the ramp 54 onto valve seat 38 on which it will be held, by magnetic attraction, in closed position. The ball valve retaining characteristics of the ramp 54 may vary by varying the configuration of the upper surface. The ball valve 44 must always be moved to closed position on valve seat 38 when the earthquake reaches a magnitude of about 5.4 on the richter scale which would cause substantial structural damage. With this construction, the ball valve 44 is supported and retained on the ramp 54 in laterally and vertically spaced relation to the valve seat 38 thereby maintaining a flow path from the gas inlet fitting, either 26, 28 or 30 to the gas outlet fitting 32. The ramp structure 54 will enable gravity movement of the ball 44 when the structure retaining the ball 44 on the ramp 54 is overcome by the violent movements caused by the earthquake so that the valve will move onto the valve seat 38. The ends of the members 56 and 63 provide contact with the ball valve 44 below the center of the ball valve when it is moved from the ball valve seat 38 back onto the ramp 54.

The separable component 62 of the valve body 24 also includes flat top and bottom surfaces 68 and 69 which are continuations of the surfaces 48 and 50 on valve body 24. Spaced above the bottom surface 69 is a projection 70 underlying the ramp 54 and a shouldered recess 72 defines a shoulder 74 which telescopes into the hollow interior of the lateral hollow portion 52 of the hollow interior 34 of the valve body 24. The external vertical surfaces of the valve body 24 and the removable component 62 are smoothly curved to form an elliptical configuration as illustrated in FIG. 2. Opposite sides of component 62 include S recesses 76 provided for fasteners 78 which thread into internally threaded bores 79 in the valve body 24 to securely but detachably secure the removable component 62 to the valve body 24 to enable access to the interior of the valve body 24 to enable cleaning, inspection, repair and replacement of internal components when necessary.

The structure for moving the ball valve 44 from its closed position in engagement with the valve seat 38 to its open position on the ramp 54 includes an elongated rod 80 of generally L-shaped configuration having a downturned inner end 82 normally positioned adjacent the internal surface of the hollow portion 34 of the valve body 24 in a position that will not interfere with the ball valve 44 moving onto the valve seat 38 from ramp 54 with the terminal end of the downturned end 82 terminating adjacent the valve seat 38 as illustrated in FIG. 4. The longer and generally horizontally disposed portion 84 of the rod 80 extends through and is slidably supported and guided by a supporting bushing 86 positioned in a hollow interior recess 88 of the removable component 62 of the valve body and the terminal end of rod portion 84 extends through an opening 90 in removable component 62. The terminal end of horizontal portion 84 of the rod 80 is externally threaded for mounting a spherical knob 92 thereon which is oriented in a transverse notch 94 in the curved end wall of the removable component 62 to provide access to knob 92. The knob 92 defines a handle for the rod 80 in order to move the rod 80 in a horizontal reciprocatory manner to manually move the ball valve 44 from the valve seat 38 back onto the ramp 54.

A compression coil spring 96 is mounted on an internal portion of the horizontal component 84 of the rod 80 with one end of the spring 96 engaging a transverse pin 98 adjacent the curved portion of the rod 80. The other end of spring 96 engages an end of the bushing 86 to bias the rod 80 to the position illustrated in FIG. 4 with the knob handle 92 against the inner surface of the notch 94 and the downturned end 82 being spaced laterally of the valve seat 38 opposite to ramp 54. The bushing 86 includes opposed longitudinal slots 100 which guidingly receive a transverse guide pin 102 on the horizontal portion 84 of the rod 80 to guide movement of the rod 80 and to retain the downturned end portion 82 of the rod 80 in a generally vertical position during reciprocation of the rod 80 for moving the ball valve from magnetic engagement with the ball valve seat 38 back onto the ramp 54 where it will be retained in open position.

The valve 10 must be mounted on rigid gas pipe systems and to ensure activation by seismic activity, the valve should be attached firmly to adjacent building structure or securely in relation to the ground surface. Any necessary brackets may be utilized to brace the valve or secure the valve to a pipe or other building structure. Also, the valve must be installed in accordance with building codes or other ordinances of various jurisdictions. The valve may be used with various gas systems. When installed, any of the three gas inlets not being utilized must be provided with a plug to close off the unused inlets. The valve should be installed with the inlet 26 and the discharge fitting 32 generally in a vertical position which can be facilitated by mounting a bullseye bubble level 104 in a cavity 105 in the top surface 68 of the removable component 62. Also, to enable observation of the position of the ball valve 44, the top surface 48 of the valve body 34 is provided with a sight glass 106 mounted in a passageway 108 that enables observation of the position of the ball valve 44 in order to determine whether the ball valve is in an open or closed positions.

When the ball valve has been moved to closed position in response to intense seismic activity and violent movements of an earthquake having a magnitude that would be destructive of gas lines such as over 5 on the richter scale, the main shutoff valve 14 should be manually closed. After all aftershocks cease, all gas inlets, outlets and connections with utilities and appliances should be inspected and if no damage is visibly observable, the gas line valve 10 may be reset by grasping the knob handle 92 and moving the rod 80 so that the depending end 82 of the rod engages the ball valve 44 and moves it from the ball valve seat 38 back onto the ramp 54. The gas shutoff valve 14 may then be opened and all gas inlets and outlets, appliances and utilities again inspected, sniffed for odor and tested for leaks.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A resettable earthquake valve installed in a gas supply line to close in response to movements resulting from an earthquake, said valve including a valve body having a hollow internal area, a plurality of selectively usable gas inlets in said body, a gas outlet in a lower portion of said body, said inlets and outlet communicating with said hollow internal area, an upwardly facing valve seat in said outlet, a ball valve in said hollow internal area, a laterally extending ball valve supporting and retaining ramp in said hollow internal area, said ramp being downwardly inclined towards said valve seat and including a terminal end adjacent the valve seat for gravitational movement of the ball valve from the ramp onto the valve seat to close said outlet in response to movements resulting from an earthquake of predetermined magnitude, said ball valve being magnetically attracted to said seat to retain the ball valve on the seat when subjected to subsequent earthquake movements, and a manually operated reset device mounted on the valve body to move the ball valve back onto the ramp after termination of earthquake movements.

2. The valve as defined in claim 1, wherein said valve seat is constructed as a magnet and said ball valve is constructed of material magnetically attracted to the valve seat to retain the ball valve directly on the valve seat during earthquake aftershocks.

3. The valve as defined in claim 2, wherein said manually operated reset device includes an operating rod movably mounted on said valve body and including an internal end portion engageable with the ball valve when on the ball valve seat, said rod including a handle oriented externally of the valve body for moving the rod to move the ball valve from the valve seat onto the ramp thereby resetting the valve to open condition, said valve body including a recess in an external surface thereof substantially receiving said handle to enable access thereto but preventing damage to the handle and reset operating rod.

4. The valve as defined in claim 3, wherein said operating rod is of L-shaped configuration and reciprocally slidably mounted in said valve body, said rod including a short rod segment positioned vertically in the internal hollow area of the valve body adjacent a portion of the valve seat in remote relation to the ramp for movement across the valve seat to engage the ball valve and move the ball valve onto the ramp.

5. The valve as defined in claim 4, wherein said valve body includes a level indicator to position the valve body vertically with the outlet oriented vertically downwardly with the valve seat opening vertically upwardly.

6. The valve as defined in claim 1, wherein said valve body is generally elliptical in plan configuration to provide curved external vertical side surfaces, said valve body including a separate component forming a closure for the hollow internal area and providing access to the hollow internal area for inspection, repair and replacement of components.

7. The valve as defined in claim 1, wherein said valve body inlets include at least one lateral inlet and one vertical inlet communicating with the internal hollow area of the valve body above said outlet to enable versatility in connection with a gas supply main.

8. The valve as defined in claim 1, wherein said valve body includes an opening closed by a sight glass in registry with the ball valve, ramp and seat in order to observe the ball valve to determine its position.

Figure 8:
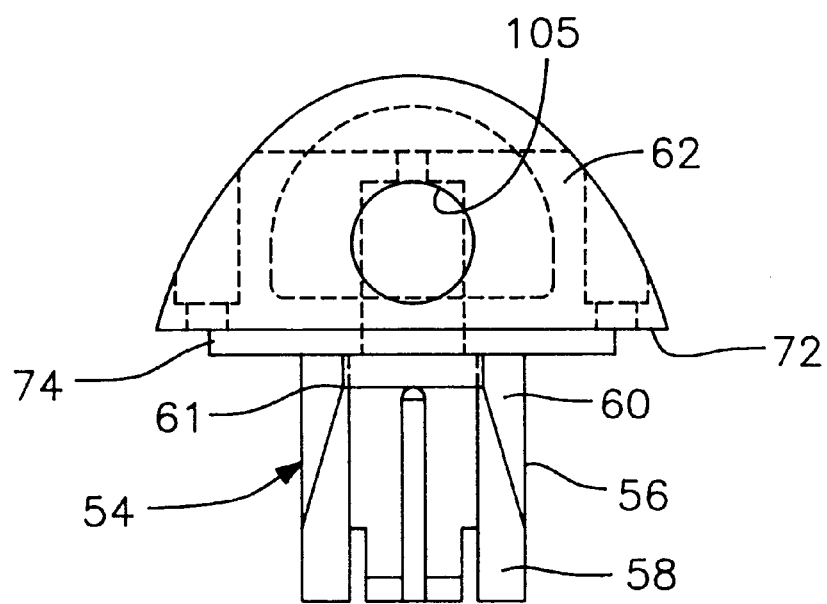
FIG. 8 is a top plan view of the separable component of the valve body.

9. The valve as defined in claim 1, wherein said ramp includes an upwardly facing surface contoured to support the ball valve and retain the ball valve during movements caused by an earthquake having a magnitude less than approximately 5.4 on the richter scale with the figure 8 movement resulting from an earthquake having a magnitude at or above 5.4 on the richter scale causing the ball to be discharged from the ramp onto the valve seat.

10. A gas valve for installation in a gas supply line to close in response to movements resulting from an earthquake, said valve including a valve body having a hollow interior chamber, a gas inlet in said body, a gas outlet in said body, said inlet and outlet communicating with said hollow interior chamber, a valve seat between said inlet and outlet, a ball valve in said hollow interior chamber, a laterally extending ball valve supporting and retaining ramp in said hollow interior chamber, said ramp being downwardly inclined towards said valve seat and including a terminal end adjacent the valve seat for gravitational movement of the ball valve from the ramp onto the valve seat to close said outlet in response to movements resulting from an earthquake of predetermined magnitude, said ball valve being magnetically attracted to said seat to retain the ball valve on the seat when subjected to subsequent earthquake movements, and a manually operated reset device mounted on the valve body to move the ball valve from the valve seat back onto the ramp after termination of earthquake movements, said valve seat being a magnet and said ball valve being constructed of material magnetically attracted to the valve seat to retain the ball valve in closing relation to the magnet forming the valve seat during earthquake aftershocks, said manually operated reset device including an operating rod movably mounted on said valve body and including an inner end portion extending into the interior chamber engageable with the ball valve when on the valve seat, said rod including a handle oriented externally of the valve body for moving the rod to move the ball valve from the valve seat onto the ramp thereby resetting the valve to open condition, said operating rod being of L-shaped configuration and reciprocally slidably mounted in said valve body, said inner end portion of the rod including a short rod segment positioned vertically in the interior chamber of the valve body adjacent the portion of the valve seat in remote relation to the ramp for movement transversely across the valve seat to engage the perimeter of the ball valve opposite the ramp and move the ball valve onto the ramp.

11. The valve as defined in claim 10, wherein said valve body is generally elliptical in plan configuration to provide curved external vertical side surfaces, said valve body including a separate component forming a closure for the hollow interior chamber and providing access to the hollow interior chamber for inspection, repair and replacement of components, said separate component of said valve body including said operating rod and ramp to provide access to the ball valve and valve seat, said operating rod having a spring mounted thereon biasing said short rod segment on the inner end of said operating rod across the valve seat in remote relation to the ramp.

12. The valve as defined in claim 11, wherein said valve body includes multiple inlets including at least one lateral inlet and one vertical inlet communicating with the interior hollow chamber above said valve seat to enable versatility in connection with a gas supply main.

* * * * *